(12) United States Patent
Yu

(10) Patent No.: US 7,855,731 B2
(45) Date of Patent: Dec. 21, 2010

(54) IMAGE VIBRATION-COMPENSATING APPARATUS AND METHOD THEREOF

(75) Inventor: Shu-Han Yu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1322 days.

(21) Appl. No.: 11/308,160

(22) Filed: Mar. 9, 2006

(65) Prior Publication Data

US 2007/0132852 A1 Jun. 14, 2007

(30) Foreign Application Priority Data

Dec. 12, 2005 (TW) ............................... 94143839 A

(51) Int. Cl.
*H04N 5/228* (2006.01)
(52) U.S. Cl. .................... 348/208.6; 348/169
(58) Field of Classification Search ............. 348/208.1, 348/208.6, 208.14
See application file for complete search history.

(56) References Cited

U.S. PATENT DOCUMENTS

| | | | | |
|---|---|---|---|---|
| 5,212,740 | A * | 5/1993 | Paek et al. ................. | 382/266 |
| 5,387,947 | A * | 2/1995 | Shin ........................... | 348/699 |
| 5,748,231 | A | 5/1998 | Park et al. ............... | 348/207.99 |
| 5,905,527 | A | 5/1999 | Inou et al. ............... | 348/207.99 |
| 5,909,242 | A | 6/1999 | Kobayashi et al. .......... | 348/208 |
| 6,049,354 | A | 4/2000 | Sekine et al. ............ | 348/208.6 |
| 6,112,319 | A | 8/2000 | Paulson ....................... | 714/49 |
| 6,480,615 | B1 * | 11/2002 | Sun et al. .................... | 382/103 |
| 6,535,244 | B1 | 3/2003 | Lee et al. ................. | 348/208.1 |
| 7,468,743 | B2 * | 12/2008 | Washisu .................. | 348/208.1 |
| 7,489,341 | B2 * | 2/2009 | Yang et al. ............. | 348/208.99 |
| 7,605,845 | B2 * | 10/2009 | Batur ....................... | 348/208.6 |
| 7,609,293 | B2 * | 10/2009 | Faulkner et al. .......... | 348/208.6 |
| 7,649,549 | B2 * | 1/2010 | Batur ....................... | 348/208.6 |
| 7,705,884 | B2 * | 4/2010 | Pinto et al. ............. | 348/208.99 |
| 7,705,885 | B2 * | 4/2010 | Prieto et al. ............ | 348/208.99 |
| 2004/0001147 | A1 * | 1/2004 | Vella et al. ............. | 348/208.99 |
| 2004/0258152 | A1 * | 12/2004 | Herz .......................... | 348/169 |
| 2006/0044405 | A1 * | 3/2006 | Kawahara ............... | 348/208.99 |

FOREIGN PATENT DOCUMENTS

EP 589643 A1 * 3/1994

OTHER PUBLICATIONS

"VHS camcorder with electronic image stabilizer" jointly authored by Oshima, et al., IEEE Trans. on Consumer Electronics, vol. 35, No. 4, pp. 749-758, Nov. 1989.

(Continued)

*Primary Examiner*—John M Villecco
(74) *Attorney, Agent, or Firm*—Jianq Chyun IP Office

(57) ABSTRACT

An image vibration-compensating apparatus and a method thereof are provided. The apparatus and the method are applied in an image-capturing apparatus, such as a digital still camera (DSC) or digital video recorder (DVR), for compensating image vibration when capturing an image. The image vibration-compensating apparatus comprises an adaptive edge extractor, a sub-region movement detector, a frame motion calculator, and a correcting vector generator. The image vibration-compensating apparatus analyses the difference between the current image and the previous image, and outputs the correcting motion vector to achieve the function of image vibration-compensation. In the image vibration-compensating method, an accumulate compensation mode is used to prevent fast motion of an image frame which will cause discomfort of the user's eyes when a relatively large image vibration occurs in a short period.

21 Claims, 8 Drawing Sheets

OTHER PUBLICATIONS

"Automatic image stabilizing system by full-digital signal processing" jointly authored by Uomori, et al., IEEE Trans. on Consumer Electronics, vol. 36, No. 3, pp. 510-519, Aug. 1990.

"Electronic Image Stabilization System for Video Cameras and VCRS" jointly authored by Uomori, et al., SMPTE Journal, pp. 66-75, Feb. 1992.

"Digital Image stabilizing algorithms based on bit-plane matching" jointly authored by Ko, et al., IEEE Trans. on Consumer Electronics, vol. 44, No. 3, pp. 617-622, Aug. 1998.

"Fast Digital Image stabilizer based on gray-coded bit-plane matching" jointly authored by Ko, et al., IEEE Trans. on Consumer Electronics, vol. 45, No. 3, pp. 598-603, Aug. 1999.

"An Adaptive motion decision system for digital image stabilizer based on edge pattern matching" jointly authored by Paik, et al., IEEE Trans. on Consumer Electronics, vol. 38, No. 3, pp. 607-616, Aug. 1992.

"A Novel four step search algorithm for fast block motion estimation" jointly authored by Po, et al., IEEE Trans. on circuits and systems for video technoloy, vol. 6, No. 3, pp. 313-317, Jun. 1996.

"A novel cross-diamond search algorithm for fast block motion estimation" jointly authored by Cheung, et al., IEEE Trans. on circuits and systems for video technology, vol. 12, No. 12, pp. 1168-1177, Dec. 2002.

"A new three-step search algorithm for block motion estimation" jointly authored by Li, et al., IEEE Trans. on circuits and systems for video technology, vol. 4, No. 4, pp. 438-442, Aug. 1994.

"A new Diamond search algorithm for fast block-matching motion estimation" jointly authored by Zhu, et al., IEEE Trans. on image processing, vol. 9, No. 2, pp. 287-290, Feb. 2000.

\* cited by examiner

IMAGE VIBRATION-COMPENSATING APPARATUS AND METHOD THEREOF

CROSS-REFERENCE TO RELATED APPLICATION

This application claims the priority benefit of Taiwan application serial no. 94143839, filed on Dec. 12, 2005. All disclosure of the Taiwan application is incorporated herein by reference.

BACKGROUND OF THE INVENTION

1. Field of Invention

The present invention relates to an image-capturing apparatus, and more particularly, to an image vibration-compensating apparatus and a method thereof applied in the image-capturing apparatus.

2. Description of Related Art

The digital image-capturing apparatus has replaced the conventional mechanical image-capturing apparatus. Many control and calculation mechanisms used in the digital image-capturing apparatus have replaced the conventional mechanical camera components. Therefore, light, thin, short, and small digital image-capturing apparatuses widely accepted by consumers are commercially available. However, when the digital image-capturing apparatus becomes light and thin, an image vibration may be resulted from the vibration of the digital image-capturing apparatus while capturing an image and thus the photo image frame cannot meet the user's expectation. Such a case is more obvious when the digital image-capturing apparatus is used with one hand.

Technology for solving the above vibration phenomenon of the digital image-capturing system has been under development for a period of time. For example, a gyroscope is used to detect the movement of the digital image-capturing system when capturing the image, and then the gyroscope calculates two parameters produced by rotation, and a lens component is driven to rotate in an opposite direction according to the two parameters to compensate the image motion. However, the gyroscope detector and the gimbals mechanism have the shortcomings of great weight, large volume, high price, etc., such that the volume and weight of the digital image-capturing apparatus cannot be reduced and the cost is increased.

In another conventional technology, disclosed in U.S. Pat. No. 6,535,244, a bit plane matching is used to correct the input image. Said conventional technology includes determining a best bit plane by analyzing the input image signal and converting it into eight bit planes and by referencing the amount of lumens and the bit conversion rate of each bit plane, and then comparing the pixel values of four detection windows at four corners of the best bit plane of the current image and the pixel values of four detection windows at four corners of the best bit plane of the previous image. Thereby, after calculating the motion vectors of the detection windows and accumulating multiple motion vectors, the image is made to move in an opposite direction of the motion vector. However, the manner of determining the best bit plane by referencing the amount of lumens and the bit conversion rate of each bit plane is not perfect. If the best bit plane cannot be determined in a certain reliable manner, the efficiency of the image stabilizing device will be reduced, thus the conventional technology needs to be improved.

SUMMARY OF THE INVENTION

An object of the present invention is to provide an image vibration-compensating apparatus, applied in image-capturing apparatus such as a digital still camera (DSC) and a digital video recorder (DVR), wherein the image data captured by the image-capturing apparatus is simplified for a subsequent calculation, thus reducing the calculation requirement. Therefore, an image-capturing apparatus with a hand-vibration compensation function and a reasonable price can be provided.

Another object of the present invention is to provide an image vibration-compensating method, applied in an image-capturing apparatus such as a DSC or DVR, wherein a visual discomfort caused by a fast jitter of the image frame can be prevented, and stability control of the image frame can be achieved.

Based on the above and other objects, the present invention provides an image vibration-compensating apparatus, such that the image-capturing apparatus can compensate the captured image. The image vibration-compensating apparatus comprises an adaptive edge extractor, a sub-region movement detector, a frame motion calculator, and a correcting vector generator. The adaptive edge extractor is used for receiving an image signal of the image, calculating an edge feature value of each pixel in the image signal and outputting an edge feature signal. The edge feature frame constituted by edge feature signals has multiple sub-regions. The sub-region movement detector is electrically connected to the adaptive edge extractor for searching a sub-region in the previous edge feature frame similar to each sub-region of the current edge feature frame respectively, so as to output multiple first motion vectors. The frame motion calculator is electrically connected to the sub-region movement detector for calculating a second motion vector of the current image corresponding to the previous image according to multiple first motion vectors. The correcting vector generator is electrically connected to the frame motion calculator for accumulating the second motion vector in a predetermined period, and thereby outputting a correcting motion vector. After that, the image-capturing apparatus compensates the image vibration according to the correcting motion vector.

In one embodiment of the present invention, the image vibration-capturing device is a DSC or a DVR, and the edge feature frame represents the corresponding edge feature signal of each pixel by binary data. Said adaptive edge extractor comprises a noise filter, an edge feature extracting unit, and an adaptive converting unit. The noise filter is used for receiving the image signal and filtering the noise. The edge feature extracting unit is electrically connected to the noise filter, and used for calculating the edge feature value of each corresponding pixel in the image signal in a manner of weight-averaging to obtain and output the edge feature information of the image signal. Also, the adaptive converting unit is electrically connected to the edge feature extracting unit for converting the edge information of the image signal into a binary edge feature signal according to a threshold value.

In one embodiment of the present invention, the adaptive converting unit determines the current threshold value according to the proportion of the ones with high level in the previous edge feature signal. The sub-region movement detector comprises an edge feature memory, a correlation calculator and a motion vector calculator. The edge feature memory is used for storing the previous edge feature frame. The correlation calculator is electrically connected to the edge feature memory for receiving each sub-region of the current edge feature frame in sequence and calculating the correlation value of each sub-region of the current edge feature frame with all sub-regions in the corresponding search range of the previous edge feature frame respectively. The motion vector calculator is electrically connected to the correlation calculator for calculating and outputting the first motion vector of each sub-region of the current edge feature frame according to multiple correlation values provided by the correlation calculator.

In one embodiment of the present invention, the frame motion calculator outputs the one with the highest correlation value among multiple first motion vectors as a second motion vector. The correcting vector generator further determines whether to operate in a single frame compensation mode or in an accumulate compensation mode according to the setting. When in the single frame compensation mode, the correcting vector generator continuously receives the second motion vector output by the frame motion calculator in each said predetermined period and composes the second motion vector received in the predetermined period as a correcting motion vector. Otherwise, when in the accumulate compensation mode, the correcting vector generator composes the second motion vector received in the predetermined period as the correcting motion vector and determines whether to reduce the output correcting motion vector progressively according to the relationship between the predetermined determinate parameter and the output correcting motion vector.

The image vibration-compensating method disclosed in the present invention is used for compensating the image captured by the image-capturing apparatus. The image vibration-compensating method comprises first capturing and calculating the edge feature signal in the image to obtain the edge feature frame, wherein the edge feature frame has multiple sub-regions; searching a similar sub-region in the edge feature frame of the previous image, respectively, according to each sub-region of the edge feature frame of the current image to obtain multiple first motion vectors; then calculating a second motion vector of the current image corresponding to the previous image according to the first motion vectors; accumulating the second motion vector in the predetermined period, and thereby outputting a correcting motion vector; and compensating the image vibration according to the correcting motion vector by the image-capturing apparatus.

In one embodiment of the present invention, the image-capturing apparatus is a DSC or a DVR. In addition, the edge feature frame presents the edge feature value of each pixel in the image by binary data.

In one embodiment of the present invention, the step of capturing the edge feature signal in the image in the above image vibration-compensating method comprises filtering the noise of the image; calculating the corresponding pixels in the image in a manner of weight-averaging to obtain the edge information of the image; and converting the edge information of the image into a binary edge feature signal according to the threshold value; and constituting the edge feature frame by the edge feature signals. The current threshold value is determined according to a proportion of the ones of high level in the previous edge feature signals.

In one embodiment of the present invention, the step of searching a similar sub-region in the edge feature frame of the previous image to obtain multiple first motion vectors in the above image vibration-compensating method comprises calculating the correlation values of each sub-region of the current edge feature frame and all sub-regions in corresponding search range of the previous edge feature frame; and calculating and outputting the first motion vector of each sub-region in the current edge feature frame, respectively, according to multiple correlation values. And the second motion vector in the subsequent steps is the one with the highest correlation value among the multiple first motion vectors.

In one embodiment of the present invention, the above image vibration-compensating method further comprises determining whether to operate the image vibration-compensating apparatus in a single frame compensation mode or in an accumulate compensation mode. When in a single frame compensation mode, the whole second motion vectors in the predetermined period are composed as the correcting motion vector. When in an accumulate compensation mode, the whole second motion vectors received in the predetermined period are composed as the correcting motion vector, and it is determined whether to reduce the correcting motion vector progressively or not according to the relationship between the predetermined determining parameter and the correcting motion vector. The accumulate compensation mode further comprises first designating a determining parameter; composing the current second motion vector to a correcting motion vector if the correcting motion vector does not exceed the determining parameter; when the current second motion vector is composed to a correcting motion vector, if the correcting motion vector exceeds the determining parameter, composing a part of the current second motion vector to the correcting motion vector; then, determining whether the composed correcting motion vector exceeds the correcting limit value or not; setting the correcting motion vector not to exceed the correcting limit value if the correcting motion vector exceeds the correcting limit value. The above accumulate compensation mode further comprises reducing the correcting motion vector successively if the correcting motion vector exceeds the determining parameter.

In the image vibration-compensating apparatus and the method thereof of the present invention, the image is converted into a binary edge feature signal. Then, the calculation of the edge feature frame constituted by the edge feature signal is carried out, such that the hand vibration phenomenon produced when using the image-capturing apparatus can be effectively compensated. Compared with the prior art, the calculation time and complexity can be significantly reduced.

From another point of view, the present invention provides an accumulate compensation mode, under which a progressive compensation can be carried out when a bigger hand vibration occurs in a short period during using the image-capturing apparatus, such that the display frame will not jitter too heavily, and further a stability of the image frame is provided, and the quality of the DSC or the DVR is promoted.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

DESCRIPTION OF EMBODIMENTS

Figure 1:
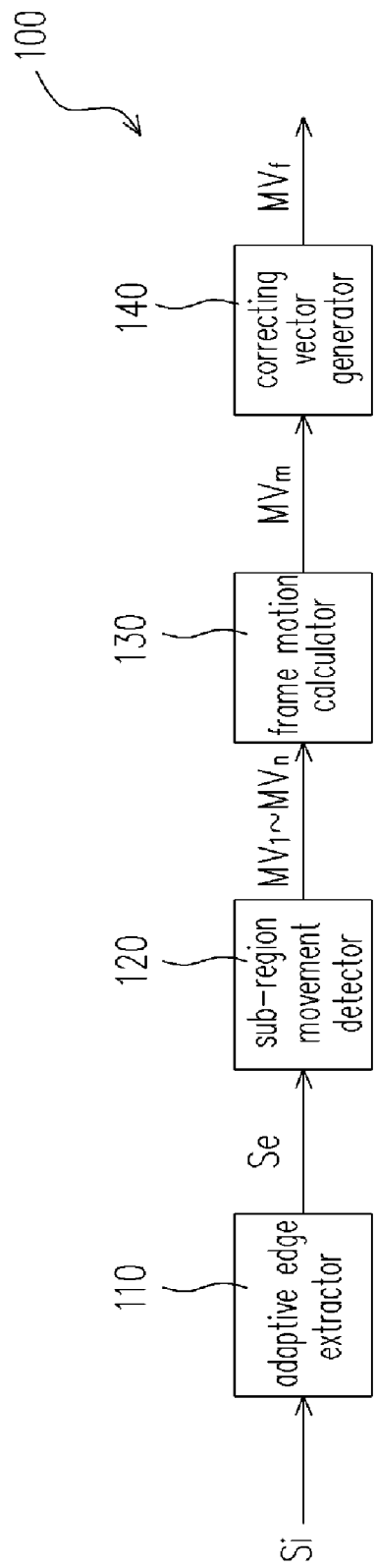
FIG. 1 is a structural block diagram of an image vibration-compensating apparatus according to one embodiment of the present invention.

FIG. 1 is a structural block diagram of an image vibration-compensating apparatus according to one embodiment of the present invention. Referring to FIG. 1, in an embodiment, an image vibration-compensating apparatus 100 is used for enabling an image-capturing apparatus such as a digital still camera (DSC) or a digital video recorder (DVR) to compensate the image frame vibration of the captured image due to the vibration. The image vibration-compensating apparatus 100 comprises an adaptive edge extractor 110, a sub-region movement detector 120, a frame motion calculator 130, and a correcting vector generator 140. The adaptive edge extractor 110 outputs an edge feature signal Se according to the image signal Si of the image frame captured by the image-capturing apparatus. The sub-region movement detector 120 is electrically connected to the adaptive edge extractor 110 for outputting multiple first motion vectors $MV_1 \sim MV_n$ according to the edge feature signal Se, where n is an integer larger than one. The frame motion calculator 130 is electrically connected to the sub-region movement detector 120 for calculating the second motion vector $MV_m$ of the current image corresponding to the previous image according to multiple first motion vectors $MV_1 \sim MV_n$. The correcting vector generator 140 is electrically connected to the frame motion calculator 130 for accumulating the second motion vector $MV_m$ in a predetermined period, thereby outputting the correcting motion vector $MV_f$. Then, the image vibration-compensating apparatus 100 compensates the vibration of the image-capturing apparatus according to the correcting motion vector $MV_f$.

Figure 2A:
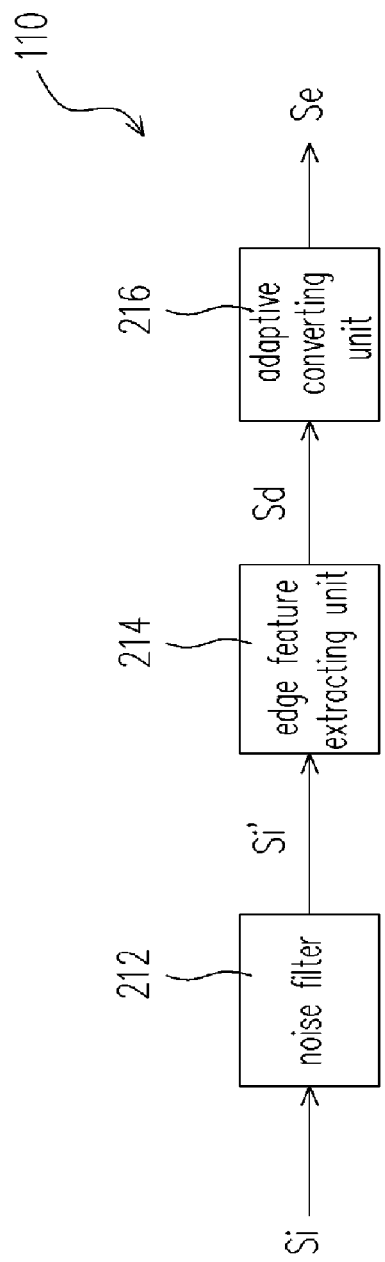
FIG. 2A is a structural block diagram of an adaptive edge extractor according to one embodiment of the present invention.
Figure 2B:
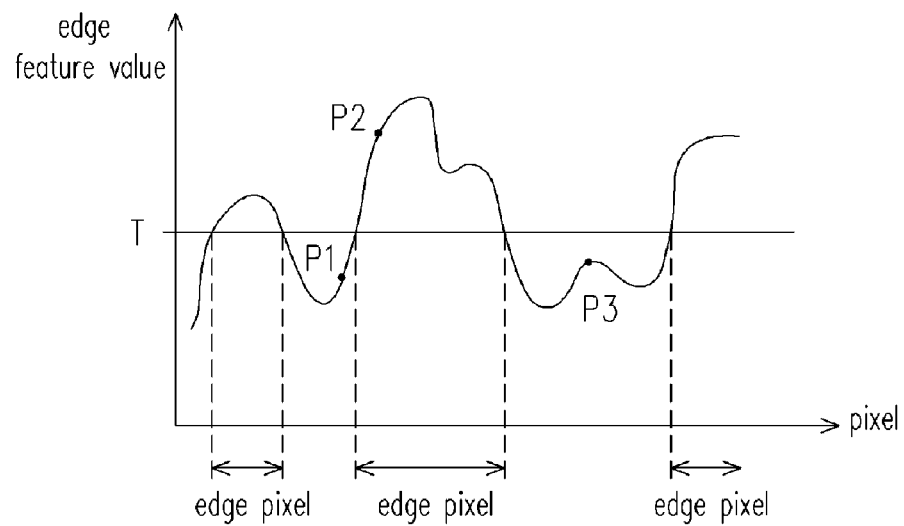
FIG. 2B is a structural block diagram of an edge feature data of an image signal according to one embodiment of the present invention.

FIG. 2A is a structural block diagram of the adaptive edge extractor according to one embodiment of the present invention. FIG. 2B is a schematic view of the edge feature data of the image signal according to one embodiment of the present invention. Referring to FIGS. 2A and 2B, the adaptive edge extractor 110 is used for receiving the image signal Si of the image, calculating the edge feature value of each pixel in the image signal Si and outputting the edge feature signal Se. The adaptive edge extractor 110 has a noise filter 212, an edge feature extracting unit 214, and an adaptive converting unit 216. The noise filter 212 is used for receiving the image signal Si, filtering the noise thereof, and outputting an image signal Si', thereby improving the uniformity of the image signal Si and increasing the accuracy of the subsequent calculation. The edge feature extracting unit 214 is electrically connected to the noise filter 212, used for calculating the edge feature value of each corresponding pixel in the image signal in a manner of weight-averaging, so as to constitute and output the edge information Sd. The manner of weight-averaging can employ, for example, the following formula:

$$g(x,y) = (\Sigma_{s=-a}^{a} \Sigma_{t=-b}^{b} w(s,t) f(x+s, y+t)) / (\Sigma_{s=-a}^{a} \Sigma_{t=-b}^{b} w(s,t)) \quad (1)$$

where g(x, y) indicates the edge feature value of the xth pixel in the yth line; w(s, t) indicates a weight function; f(x, y) indicates a pixel value; a indicates the distance of pixels around said pixel extending in an x direction which should be considered in calculating the g(x, y), i.e., pixels in a 2a×2b block around said pixel are considered in calculating g(x, y).

Furthermore, a Laplacian function for f(x, y) can be used to further enhance the ability of the image signal Si to capture detailed data. That is, $$\nabla^2 f = (\partial^2 f / \partial^2 x^2) + (\partial^2 f / \partial^2 y^2) \quad (2)$$

The adaptive converting unit 216 is electrically connected to the edge feature extracting unit 214 for converting the edge information Sd of the image signal Si into an edge feature signal Se represented by 0 and 1 according to a threshold value T, wherein a pixel with an edge feature value larger than the threshold value T is an edge pixel. In such a way, the pixel value represented by multiple bits previously is converted into the one represented by one bit. Therefore, the subsequent calculation of the image signal Si is simplified. Further, when the difference between the edge feature values of some pixel and the neighboring pixel is large, for example, the edge feature value of the pixel P2 is far larger than the edge feature values of the pixel P1 and the pixel P3, the pixel value of the pixel P2 is set to be 1 and the pixel P2 is set to be an edge pixel. All edge pixels of the edge feature signal Se are used to represent the edge of the image in the subsequent analysis and calculation.

Figure 3:
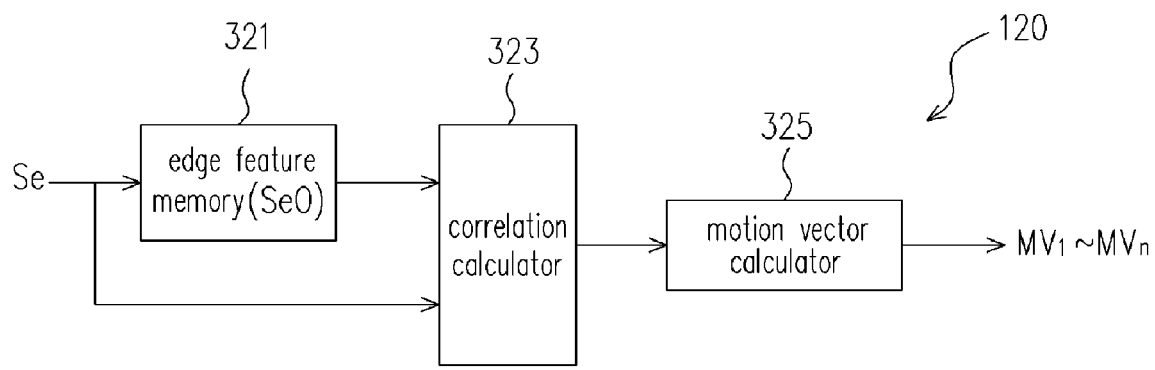
FIG. 3 is a circuit block diagram of a sub-region movement detector according to one embodiment of the present invention.
Figure 4A:
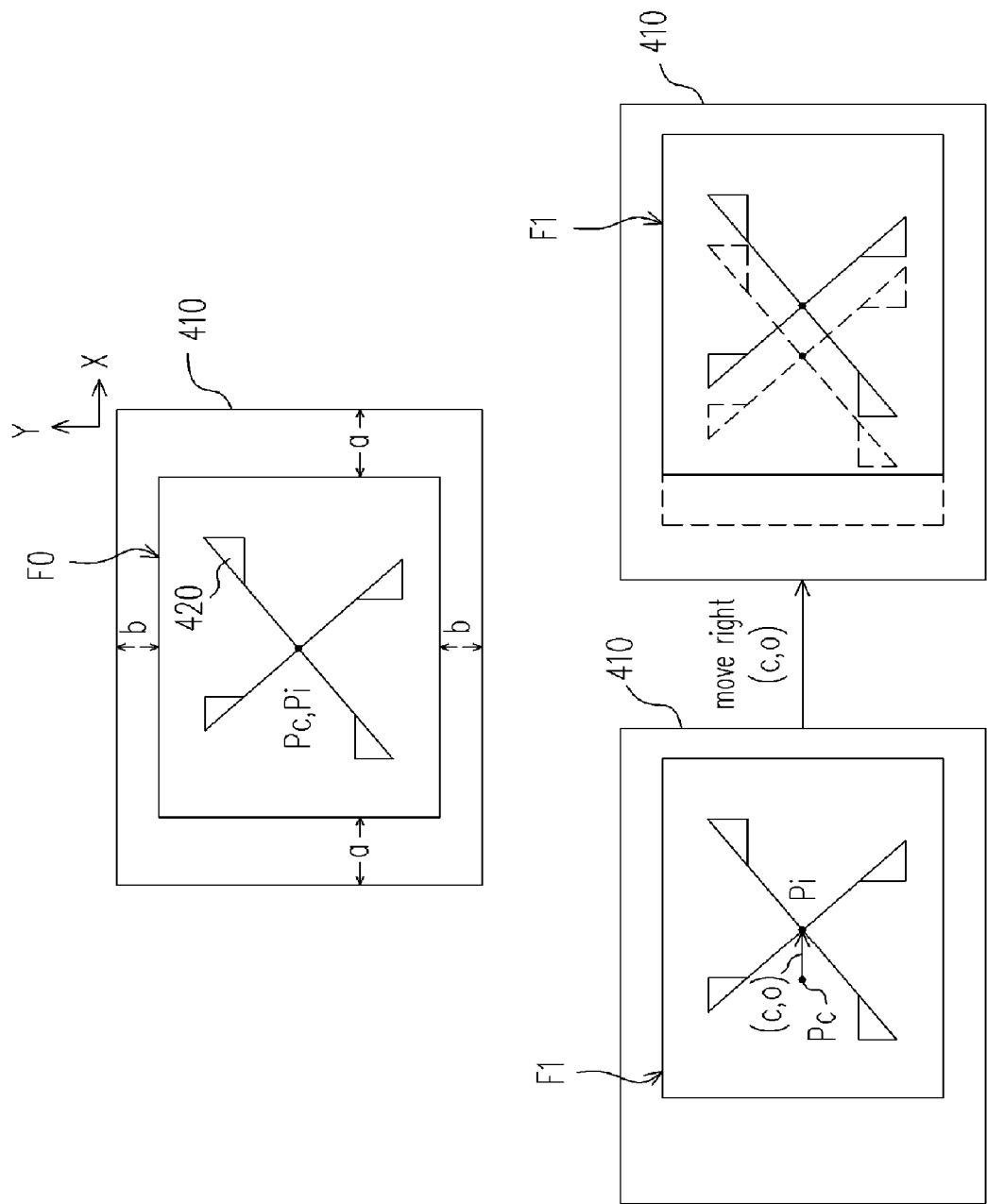
FIG. 4A is a schematic view of an image frame and a frame motion according to one embodiment of the present invention.
Figure 4B:
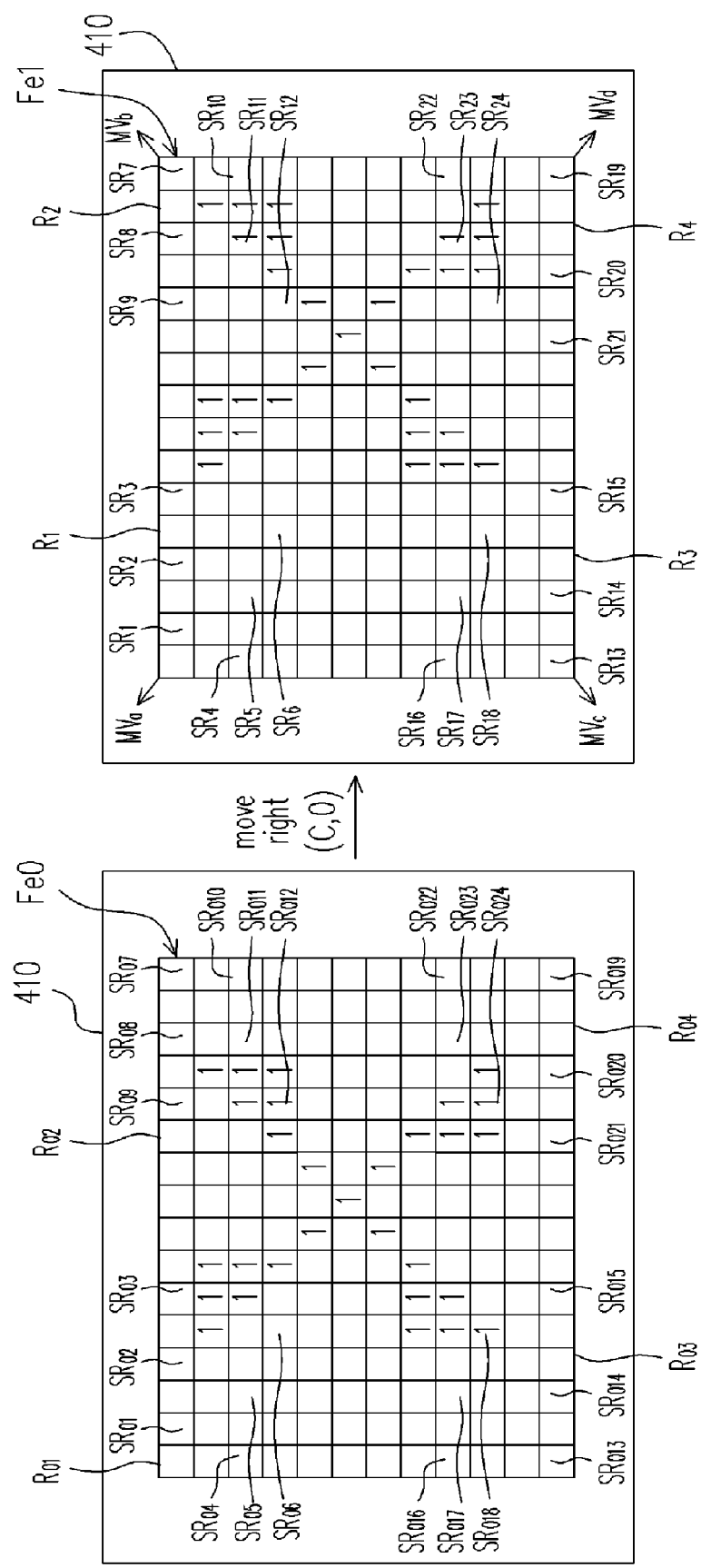
FIG. 4B is a schematic view of the process for calculating the first motion vectors of the sub-region according to the one embodiment of the present invention.

FIG. 3 is a circuit block diagram of a sub-region movement detector according to one embodiment of the present invention. FIG. 4A is a schematic view of an image frame and frame motion according to one embodiment of the present invention. FIG. 4B is a schematic view of calculating the first motion vectors of the sub-region according to one embodiment of the present invention. Referring to FIGS. 3, 4A and 4B, the sub-region movement detector 120 comprises an edge feature memory 321, a correlation calculator 323, and a motion vector calculator 325. The edge feature memory 321 is used for storing the edge feature signal Se0 of the previous image signal. The correlation calculator 323 is electrically connected to the edge feature memory 321 for receiving each sub-region of the current edge feature frame Fe1 constituted by the current edge feature signal Se in sequence, and calculating the correlation values with all positions in the corresponding search range of the previous edge feature frame Fe0 constituted by the previous edge feature signal Se0. That is, directing to some sub-region of the current edge feature frame Fe1, a comparison region (with a size equal to that of the aforementioned sub-region) is defined relative to each position in the corresponding search range of the previous edge feature frame Fe0 respectively. When the correlation calculator 323 receives some sub-region of the current edge feature frame Fe1, the correlation calculator 323 compares the sub-region with each comparison region in the corresponding search range of the Fe0, so as to output multiple correlation values according to the comparison result of each comparison region. The motion vector calculator 325 is electrically connected to the correlation calculator 323 for determining the sub-region in the previous edge feature frame Fe0 corresponding to each sub-region of the current edge feature frame Fe1 according to multiple correlation values provided by the correlation calculator 323, and calculating respectively to output the first motion vector $MV_1 \sim MV_{24}$ of each sub-region $SR_1 \sim SR_{24}$ in the current edge feature frame Fe1.

In FIG. 4A, the area of a displayable range 410 is larger than the area of the image frame F0, wherein the displayable range 410 is a range which can display the image frame on the image-capturing apparatus. The left and right sides of the image frame F0 respectively has a distance a from the edges of the displayable range 410 in the +x and −x directions, and the top and bottom sides of the image frame F0 respectively has a distance b from the edges of the displayable range 410 in the +y and −y directions.

When using the image-capturing apparatus such as a digital still camera, a common user usually puts a target in the middle of the image frame. For example, as shown in FIG. 4A, a target 420 is in the center of the previous image frame F0, and the center point Pc of the previous image frame F0 is overlapped with the center point Pi of the target 420. The previous image frame F0 is stored in the edge feature memory 321 through the previous edge feature signal Se0 to be converted. The target 420 is shifted to the right side of the previous image frame F0 for a motion vector (x, y)=(c, 0) because of the vibration of the image-capturing apparatus, and a current image frame F1 is thus formed. That is, the point Pi of the target 420 is moved right to the center point Pc of the previous image frame F0 for distance c. In this embodiment, the current image frame F1 is shifted right for distance c, such that the center point of the current image frame F1 is overlapped with the center point Pi of the shifted target 420.

In a more detailed description, the image signal Si of the current image frame F1 generates a current edge feature signal Se via the above calculation, and the current edge feature frame Fe1 is constituted by the current edge feature signals Se. To simplify the calculation and reduce the calculation requirements, in FIG. 4B, the current edge feature frame Fe1 is designed to have four regions $R_1 \sim R_4$ at four corners, wherein each region is divided into six sub-regions, with a total of 6×4=24 sub-regions $SR_1 \sim SR_{24}$. For clarity, the pixel value of the edge pixel on the edge feature frame Fe1 is 1, and the marks of the pixel values 0 of other pixels are omitted. Similarly, the previous edge feature frame Fe0 constituted by the previous edge feature signal Se0 is designed in a same manner to have four regions $R_{01} \sim R_{04}$ at four corners, wherein each region is divided into six sub-regions, with a total of 6×4=24 sub-regions $SR_{01} \sim SR_{024}$.

Figure 4C:
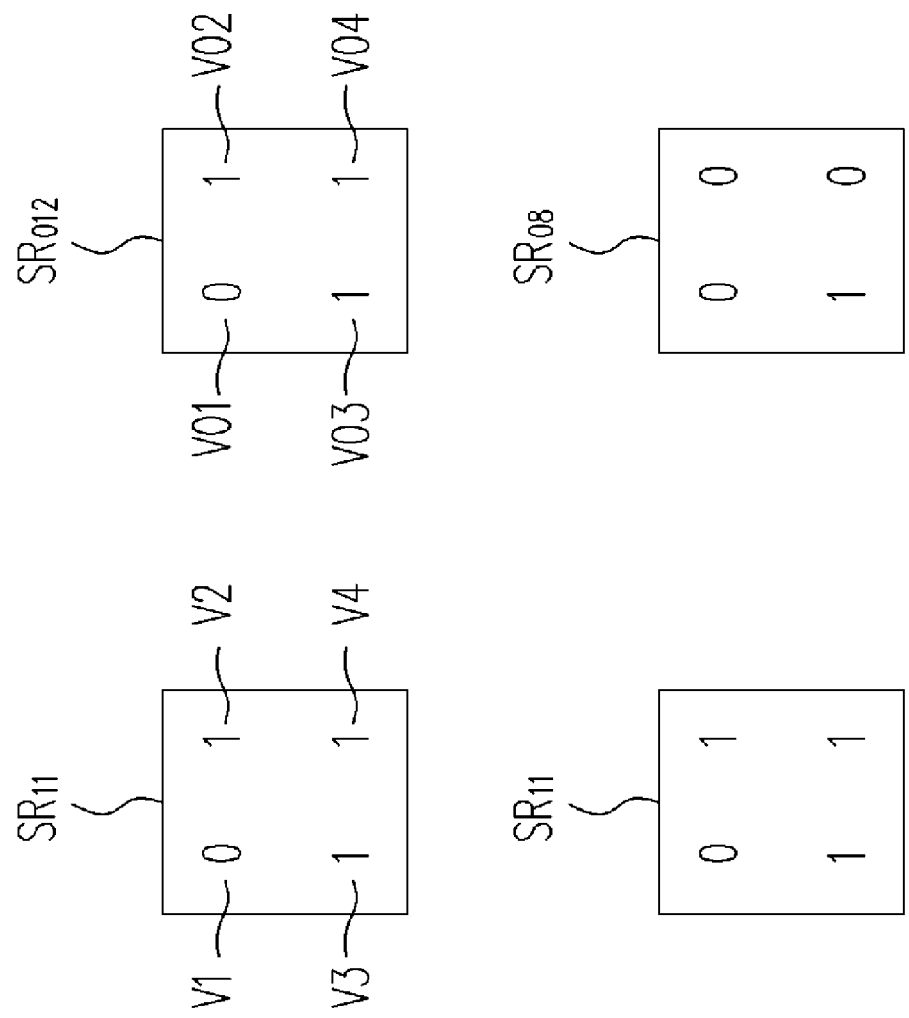
FIG. 4C is a schematic view of calculating the correlation value of the sub-regions according to one embodiment of the present invention.

FIG. 4C is a schematic view of calculating the correlation values of the sub-region according to one embodiment of the present invention. Referring to FIGS. 4B and 4C, taking the sub-region $SR_{11}$ for example, the sub-region $SR_{11}$ of the region $R_2$ will be verified with all sub-regions $SR_{07} \sim SR_{012}$ of the region $R_{02}$ by using an AND logic calculation. When the sub-region $SR_{012}$ is verified, an AND logic calculation is carried out between each pixel value V1~V4 in the sub-region $SR_{11}$ and the pixel values V01~V04 at corresponding positions in the sub-region $SR_{012}$, such that four calculation results are obtained, and added and then divided by the number of the high level pixels contained in the sub-region $SR_{11}$, that is, (V1&V01)+(V2&V02)+(V3&V03)+(V4&V04)=3, then 3÷3=1.0, where 3 is the number of high level pixels within the sub-region $SR_{11}$, i.e., the correlation value of the sub-region $SR_{11}$ and the sub-region $SR_{012}$ is 1. The correlation value of the sub-region $SR_{11}$ and the sub-region $SR_{08}$ is calculated in a same manner, and the correlation value ⅓ is obtained. After the correlation value of the sub-region $SR_{11}$ and the respective sub-region $SR_{07} \sim SR_{012}$ is calculated, the one with the highest correlation value is taken as the corresponding sub-region. In this embodiment, the correlation value of the sub-region $SR_{11}$ corresponding to the sub-regions $SR_{07}$, $SR_{09}$ and $SR_{10}$ is 0, and the correlation value corresponding to the sub-regions $SR_{08}$ and $SR_{011}$ is ⅓, and the correlation value corresponding to the sub-region $SR_{012}$ is 1.0. After comparing the six correlation values, it is determined that the correlation value of the sub-region $SR_{11}$ with the sub-region $SR_{012}$ is the largest. Therefore, it is determined that the sub-region $SR_{11}$ corresponds to the sub-region $SR_{012}$ and the first motion vector $MV_{11}$ of the two is calculated. In a same manner, the first motion vectors $MV_1 \sim MV_{24}$ are obtained.

After the first motion vectors $MV_1 \sim MV_{24}$ are determined, the first motion vectors $MV_1 \sim MV_{24}$ are received by the frame motion calculator and divided into four regions $R_1 \sim R_4$ for verification respectively. That is, the one with the highest correlation value is selected from among the first motion vectors $MV_1 \sim MV_6$ as the region motion vector $MV_a$ of the whole region $R_1$. Similarly, the one with the highest correlation value is selected from among the first motion vectors $MV_7 \sim MV_{12}$ as the region motion vector $MV_b$ of the whole region $R_2$. The one with the highest correlation value is selected from among the first motion vectors $MV_{13} \sim MV_{18}$ as the region motion vector $MV_c$ of the whole region $R_3$. And the one with the highest correlation value is selected from among the first motion vectors $MV_{18} \sim MV_{24}$ as the region motion vector $MV_d$ of the whole region $R_4$. The region motion vectors $MV_a$, $MV_b$, $MV_c$, and $MV_d$ are compared, and the one with the highest correlation value is selected as a second motion vector $MV_m$.

Figure 4D:
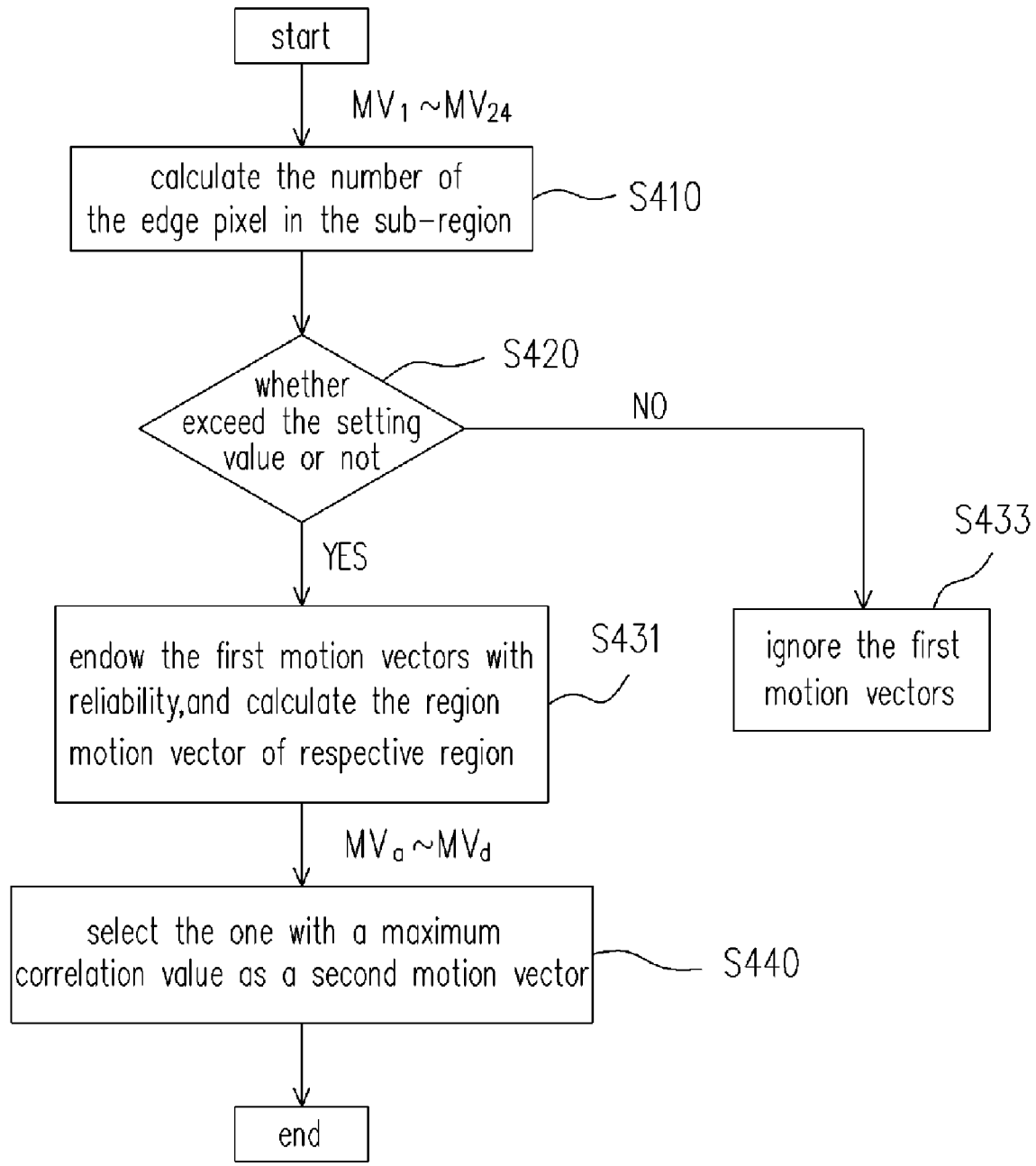
FIG. 4D is a flow chart of determining the second motion vector according to one embodiment of the present invention.

FIG. 4D is a flow chart of determining the second motion vector according to one embodiment of the present invention. Referring to FIGS. 4B and 4D, in Step S410, the number of pixels with edge feature in the sub-regions $SR_1 \sim SR_{24}$ of the first motion vectors $MV_1 \sim MV_{24}$ is calculated respectively. In Step S420, it determines whether the number of the edge pixels in the sub-regions $SR_1 \sim SR_{24}$ exceeds a setting value or not. If the number of the edge pixels in the sub-regions $SR_1 \sim SR_{24}$ exceeds a setting value, the first motion vector of the sub-regions is endowed with reliability, and the ones with the highest correlation value in individual calculate region $R_1 \sim R_4$ are taken as region motion vectors $MV_a$, $MV_b$, $MV_c$, and $MV_d$ (Step S431). Otherwise, if the number of the edge pixels in the sub-region $SR_1 \sim SR_{24}$ is less than a setting value, the first motion vectors of the sub-region are ignored (Step S433). In Step S440, the one with the highest correlation value is selected from the region motion vectors $MV_a$, $MV_b$, $MV_c$, and $MV_d$ as a second motion vector $MV_m$.

Figure 5:
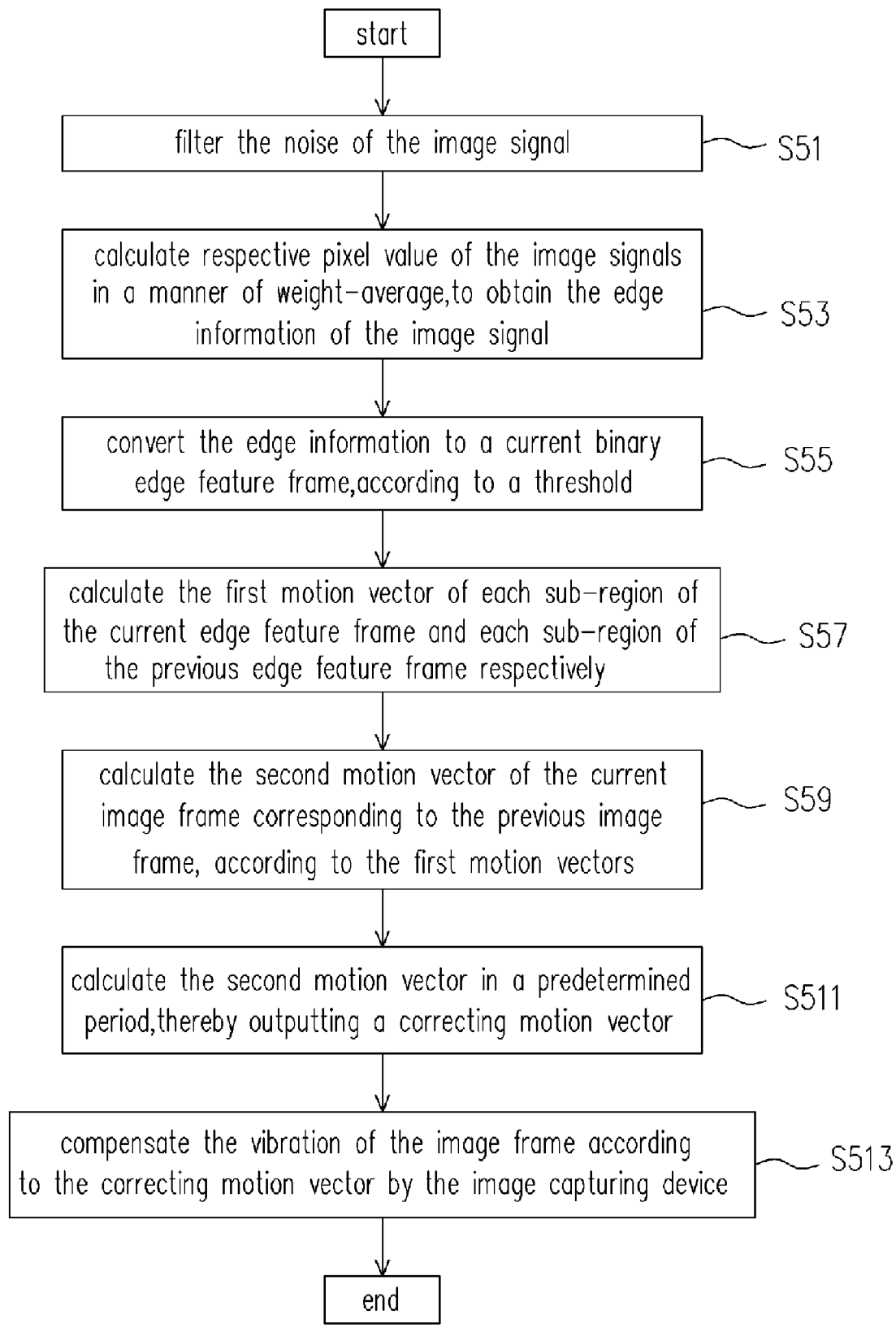
FIG. 5 is a flow chart of an image vibration-compensating method according to one embodiment of the present invention.

FIG. 5 is a flow chart of an image vibration-compensating method according to one embodiment of the present invention. Referring to FIGS. 1 and 5, the image vibration-compensating method comprises the steps as follows. In Step S51, filter the noise of the image signal Si. In Step S53, calculate the individual pixel value in the image signal Si in a manner of weight-averaging to obtain an edge information of the image signal Si. In Step S55, according to a threshold value T, convert the edge information Sd of the image signal Si into a current binary edge feature frame Fe1. In Step S57, calculate the correlation value of each sub-region $SR_1 \sim SR_n$ of the current edge feature frame Fe1 and the comparison regions formed by all positions in corresponding search range of the previous edge feature frame Fe0 respectively, and calculate and output the first motion vector $MV_1 \sim MV_n$ of each sub-region $SR_1 \sim SR_n$ in the current edge feature frame Fe1 respectively according to multiple correlation values. In Step S59, determine the second motion vector $MV_m$ of the current image frame F1 corresponding to the previous image frame F0 according to multiple first motion vectors $MV_1 \sim MV_n$. In Step S511, accumulate the second motion vector $MV_m$ in the predetermined period, thereby outputting the correcting motion vector $MV_f$. And in Step S513, the image-capturing apparatus compensates the image frame vibration according to the correcting motion vector $MV_f$. The motion vector $MV_m$ is the one with the highest correlation value among multiple motion vectors $MV_1 \sim MV_n$. And in Step S55, the current threshold value T is determined according to the proportion of the edge pixels in all pixels in the previous edge feature signal Se0.

The image vibration-compensating method comprises determining whether to operate in a single frame compensation mode or in an accumulate compensation mode. When in the single frame compensation mode, a whole second motion vector $MV_m$ in the predetermined period is composed as a correcting motion vector $MV_f$. When in the accumulate compensation mode, a part of the second motion vector $MV_m$ received in the predetermined period is composed as the correcting motion vector $MV_f$. And it determines whether to reduce the correcting motion vector $MV_f$ progressively or not according to the relationship between the predetermined determining parameter (i, j) and the correcting motion vector $MV_f$.

Figure 6:
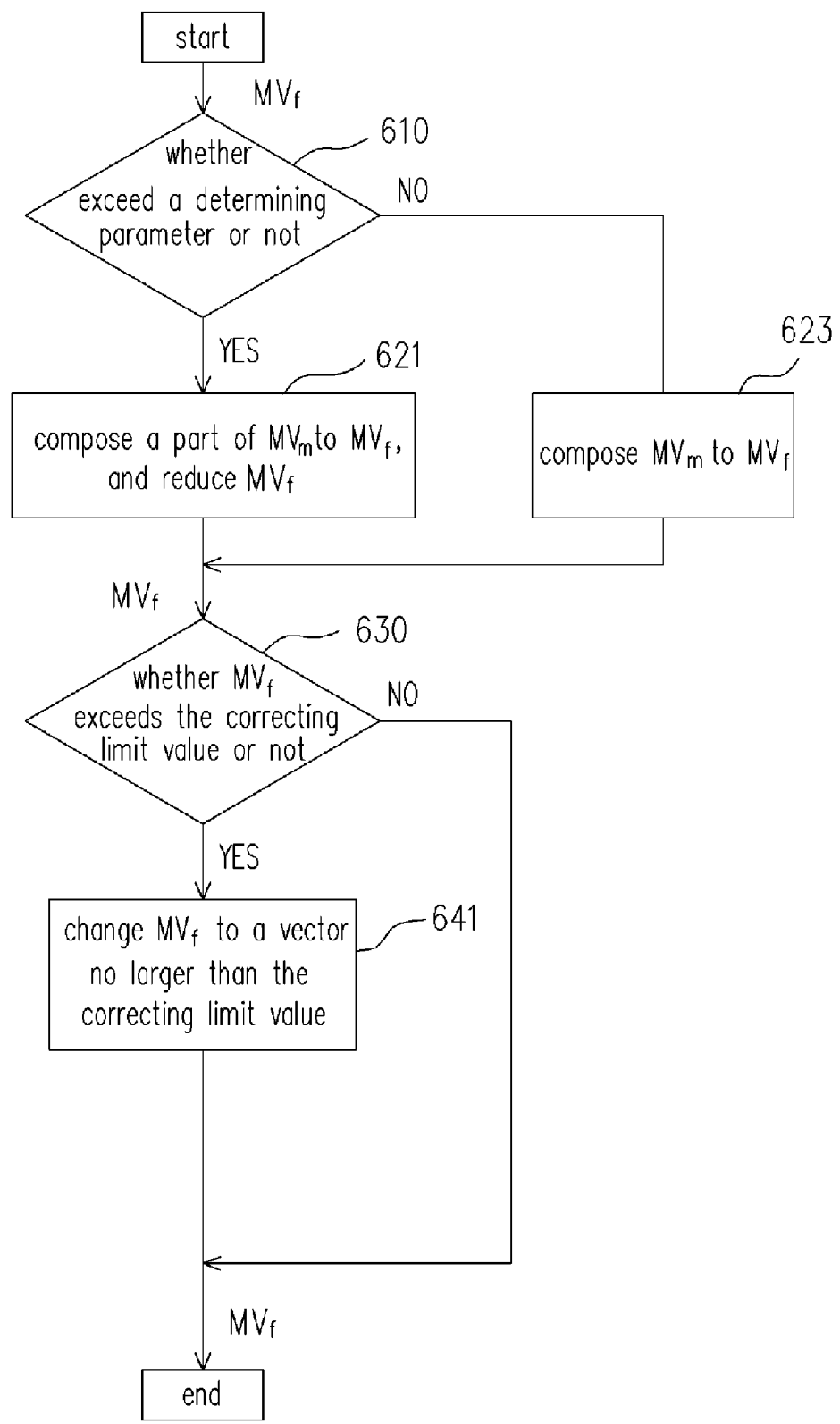
FIG. 6 is a flow chart of an accumulate compensation mode according to one embodiment of the present invention.

FIG. 6 is a flow chart of the accumulate compensation mode according to one embodiment of the present invention. Referring to FIG. 6, the mode comprises the following steps. In Step 610, a determining parameter (i, j) is designated, and it is determined that whether the composed motion vector $MV_f$ exceeds the determining parameter (i, j) or not if the second motion vector $MV_m$ is composed to the correcting motion vector $MV_f$. If the composed motion vector $MV_f$ exceeds the determining parameter (i, j), proceed to Step 621, wherein a part of the second motion vector $MV_m$ is composed to the correcting motion vector $MV_f$, and the motion vectors $MV_f$ are reduced successively. For example, the correcting motion vector $MV_f$ is (3, 0) and the second motion vector $MV_m$ is (4, 0), if the determining parameter is (4, 0), as the correcting motion vector (3+4, 0)=(7, 0) obtained by composing the second motion vector (4, 0) to the correcting motion vector (3, 0) is larger than the determining parameter (4, 0), a half of the second motion vector (4, 0) i.e. (4×1/2, 0)=(2, 0) is added into the correcting motion vector (3, 0), i.e. the added correcting motion vector is (5, 0). Moreover, if the correcting motion vector (5, 0) is larger than the determining parameter (4, 0), the correcting motion vector (5, 0) is reduced progressively, i.e. (5−1, 0)=(4, 0). If the composed motion vector $MV_f$ is less than the determining parameter (i, j), proceed to Step 623, wherein the second motion vector $MV_m$ is composed to the correcting motion vector $MV_f$. Then, in Step 630, it is determined that whether the composed correcting motion vector $MV_f$ exceeds the correcting limit value (Mx, My) or not. If the correcting motion vector $MV_f$ exceeds the correcting limit value (Mx, My), the correcting motion vector $MV_f$ is set to be a vector no larger than the correcting limit value (Mx, My) (Step 641). The correcting limit value (Mx, My) can be set to be (Mx, My)=(±a, ±b) according to the distances a, b in FIG. 4A.

In summary, in the image vibration-compensating apparatus of the present invention, an adaptive edge extractor is used for simplifying the image signal in order to obtain an edge feature signal. A sub-region movement detector is used for verifying and analyzing the first motion vectors of the sub-regions of the edge feature frame constituted by the edge feature signal. Then, a frame motion calculator is used for selecting the second motion vector according to the correlation value of individual first motion vector; and finally, a correcting vector generator is used for accumulating the second motion vector in order to provide a correcting motion vector for compensating the image frame vibration caused by the vibration of the image-capturing apparatus. Therefore, compared with the prior art, the present invention can reduce the calculation requirements and compensate the vibration of the image-capturing apparatus accurately.

Furthermore, in the image vibration-compensating method of the present invention, an accumulate compensation mode is used for carrying out a series of determination, setting and calculation. Therefore, the correcting motion vector can be compensated, such that the correcting motion vector is compensated without exceeding the correcting limit value and the correcting motion vector exceeding the determining parameter is reduced successively. Therefore, the motion of the image frame will not be too fast that causes a discomfort of the user's eyes. Furthermore, the present invention only compensates the image vibration, and will not compensate the moved frame caused by the image-capturing apparatus, thus, it is convenient for users to capture pictures while moving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image vibration-compensating apparatus, applicable to an image-capturing apparatus to compensate a captured image, the image vibration-compensating apparatus comprising:
    an adaptive edge extractor, for receiving an image signal of the image and calculating an edge feature value of each pixel in the image signal and outputting an edge feature signal, wherein an edge feature frame constituted by the edge feature signal has multiple sub-regions;
    a sub-region movement detector, electrically connected to the adaptive edge extractor, for searching a sub-region in a previous edge feature frame similar to each sub-region of a current edge feature frame respectively, and outputting a plurality of first motion vectors;
    a frame motion calculator, electrically connected to the sub-region movement detector, for calculating a second motion vector of the current image corresponding to the previous image according to the first motion vectors, wherein the frame motion calculator outputs the one with the highest correlation value among the first motion vectors as the second motion vector; and
    a correcting vector generator, electrically connected to the frame motion calculator, for accumulating the second motion vector in a predetermined period and outputting a correcting motion vector;
    wherein, the image-capturing apparatus compensates the image according to the correcting motion vector.

2. The image vibration-compensating apparatus as claimed in claim 1, wherein the image-capturing apparatus is a digital still camera (DSC).

3. The image vibration-compensating apparatus as claimed in claim 1, wherein the image-capturing apparatus is a digital video recorder (DVR).

4. The image vibration-compensating apparatus as claimed in claim 1, wherein the edge feature frame represents the edge feature of each pixel in the image by a binary edge feature signal.

5. The image vibration-compensating apparatus as claimed in claim 1, wherein the adaptive edge extractor comprises:
    a noise filter, for receiving the image signal and filtering the noise thereof;
    an edge feature extracting unit, electrically connected to the noise filter, calculating the edge feature value of each corresponding pixel in the image signal in a manner of weight-averaging, so as to obtain and output the edge information of the image signal; and
    an adaptive converting unit, electrically connected to the edge feature extracting unit, for converting the edge information of the image signal to the binary edge feature signal according to a threshold value.

6. The image vibration-compensating apparatus as claimed in claim 5, wherein the adaptive converting unit determines the current threshold value according to a proportion of the ones with high level in the previous edge feature signal.

7. The image vibration-compensating apparatus as claimed in claim 1, wherein the sub-region movement detector comprises:
    an edge feature memory, for storing the previous edge feature frame;
    a correlation calculator, electrically connected to the edge feature memory, for receiving each sub-region of the current edge feature frame in sequence, and calculating the correlation value of each sub-region of the current edge feature frame with all sub-regions in a corresponding search range of the previous edge feature frame respectively; and a motion vector calculator, electrically connected to the correlation calculator, for calculating and outputting the first motion vector of each sub-region in the current edge feature frame, respectively, according to the correlation values provided by the correlation calculator.

8. The image vibration-compensating apparatus as claimed in claim 1, wherein the correcting vector generator further determines whether to operate in a single frame compensation mode or in an accumulate compensation mode according to a setting.

9. The image vibration-compensating apparatus as claimed in claim 8, wherein when in the single frame compensation mode, the correcting vector generator continuously receives the second motion vector output by the frame motion calculator in each predetermined period, and composes the second motion vector received in the predetermined period as the correcting motion vector.

10. The image vibration-compensating apparatus as claimed in claim 8, wherein when in the accumulate compensation mode, the correcting vector generator composes the second motion vector received in the predetermined period as the correcting motion vector, and determines whether to reduce the output correcting motion vector gradually according to a relationship between a predetermined determining parameter and the output correcting motion vector.

11. An image vibration-compensating method, applicable to an image-capturing apparatus to compensate a captured image, the image vibration-compensating method comprising:
    capturing an edge feature in the image to obtain an edge feature frame, wherein the edge feature frame has multiple sub-regions;
    searching a similar sub-region in the edge feature frame of the previous image respectively according to each sub-region of the edge feature frame in the current image to obtain a plurality of first motion vectors;
    calculating a second motion vector of the current image signal corresponding to the previous image signal according to the first motion vectors, wherein the second motion vector is the one with the highest correlation value among the first motion vectors;
    accumulating the second motion vector in a predetermined period, thereby outputting a correcting motion vector; and
    compensating the image vibration by the image-capturing apparatus according to the correcting motion vector.

12. The image vibration-compensating method as claimed in claim 11, wherein the image-capturing apparatus is a DSC.

13. The image vibration-compensating method as claimed in claim 11, wherein the image-capturing apparatus is a DVR.

14. The image vibration-compensating method as claimed in claim 11, wherein the edge feature frame represents the edge feature value of each pixel in the image by binary data.

15. The image vibration-compensating method as claimed in claim 11, wherein the step of capturing the edge feature of the image comprises:
    filtering the noise of the image;
    calculating the corresponding pixels in the image in a manner of weight-averaging to obtain the edge information of the image; and
    converting the edge information of the image into a binary edge feature according to a threshold value, and constituting the edge feature frame by the edge feature signal.

16. The image vibration-compensating method as claimed in claim 15, wherein the current threshold value is determined according to a proportion of the number of the pixels represented as the edge in the previous edge feature frame in the whole edge feature frame.

17. The image vibration-compensating method as claimed in claim 11, wherein the steps of searching the similar sub-region in the edge feature frame of the previous image to obtain the first motion vectors comprise:
    calculating the correlation value of each sub-region of the current edge feature frame and all sub-regions in a corresponding search range of the previous edge feature frame respectively; and
    calculating and outputting the first motion vector of each sub-region in the current edge feature frame according to the correlation values.

18. The image vibration-compensating method as claimed in claim 11, further comprising:
    determining whether to operate in a single frame compensation mode or in an accumulate compensation mode.

19. The image vibration-compensating method as claimed in claim 18, further comprising:
    when in the single frame compensation mode, composing a whole second motion vector in the predetermined period as the correcting motion vector; and
    when in the accumulate compensation mode, composing a whole second motion vector received in the predetermined period as the correcting motion vector, and determining whether to reduce the correcting motion vector gradually according to the relationship between a predetermined determining parameter and the correcting motion vector.

20. The image vibration-compensating method as claimed in claim 18, wherein the accumulate compensation mode comprises:
    designating a determining parameter;
    if the correcting motion vector does not exceed the determining parameter, composing the current second motion vector to the correcting motion vector;
    when the current second motion vector is to be composed to the correcting motion vector, if the correcting motion vector exceeds the determining parameter, composing a part of the current second motion vector to the correcting motion vector;
    determining whether the composed correcting motion vector exceeds a correcting limit value or not; and
    if the correcting motion vector exceeds the correcting limit value, setting the correcting motion vector as a vector not exceeding the correcting limit value.

21. The image vibration-compensating method as claimed in claim 20, wherein the accumulate compensation mode further comprises:
    if the correcting motion vector exceeds the determining parameter, reducing the correcting motion vector successively.

* * * * *